United States Patent [19]
Weber

[11] Patent Number: 6,144,027
[45] Date of Patent: Nov. 7, 2000

[54] STRUCTURE OF A STEERING-ANGLE SENSOR MODULE

[75] Inventor: Petra Weber, Bietigheim-Bissingen, Germany

[73] Assignee: ITT Manufacturing Enterprises, Inc., Wilmington, Del.

[21] Appl. No.: 09/101,410

[22] PCT Filed: Jan. 11, 1997

[86] PCT No.: PCT/EP97/00111

§ 371 Date: Apr. 9, 1999

§ 102(e) Date: Apr. 9, 1999

[87] PCT Pub. No.: WO97/26506

PCT Pub. Date: Jul. 24, 1997

[30] Foreign Application Priority Data

Jan. 20, 1996 [DE] Germany .......................... 196 01 964

[51] Int. Cl.[7] .................................................. G01D 5/34
[52] U.S. Cl. ...................................... 250/231.14; 341/13
[58] Field of Search ......................... 250/231.13–231.18; 341/13, 31; 356/375

[56] References Cited

U.S. PATENT DOCUMENTS

| 4,614,869 | 9/1986 | Hoshino et al. ................. 250/231.14 |
| 4,661,698 | 4/1987 | Cappio et al. .................... 250/231.14 |
| 4,683,375 | 7/1987 | Hoshino et al. . |

FOREIGN PATENT DOCUMENTS

| 4009007 | 9/1990 | Germany . |
| 4018187 | 12/1991 | Germany . |
| 4231624 | 3/1994 | Germany . |
| 4300663 | 6/1994 | Germany . |
| 4409892 | 9/1995 | Germany . |
| 19515423 | 11/1995 | Germany . |
| 4427883 | 12/1995 | Germany . |

OTHER PUBLICATIONS

Search Report of the German Patent Office Relating to Parent German Patent Application No. 19601964.8 filed Aug. 13, 1996.
German Publication for No. G 93 15 973.0.
German Publication for No. G 82 05 311.1.

*Primary Examiner*—Stephone B. Allen
*Attorney, Agent, or Firm*—J. Gordon Lewis

[57] ABSTRACT

The present invention is concerned with a steer angle sensor for determining the steer angle in automotive vehicles. Sensors of the afore-mentioned type are required for controlling the driving stability. It is the object of the invention to arrange a code disk in a simple way opposite the housing of the sensor. This problem is solved, in the practice of the invention, in that the code disk is arranged directly on the housing. Advantageous developments refer to possible designs of the bearing.

13 Claims, 4 Drawing Sheets

STRUCTURE OF A STEERING-ANGLE SENSOR MODULE

TECHNICAL FIELD

This invention relates to angle sensors and more particularly relates to steering angle sensors.

BACKGROUND OF THE INVENTION

The present invention is concerned with a sensor for determining the steer angle, that can be mounted, for example as a commercially available unit, to the steering wheel of an automotive vehicle. Steer angle sensors are required for the yaw angle control of automotive vehicles to prevent a vehicle from steering off, for example, in a slippery bend. Control systems of the afore-described type require awareness of the steer angle of the front wheels momentarily adjusted to determine and control the driving pattern of the vehicle from the angle and other parameters. Sensors of this type, frequently are provided with a code disk coupled to the steering wheel at least indirectly so that the position of the steering wheel can be directly read from the associated codes on the code disk. The way of operation of a code disk of the afore-described type has already been described by 195 32 903.1. Code disks of this type operate with a relatively high precision which is required for an accurate control. Conversely, it is desirable to integrate the scanner of the steer angle sensor into the printed circuit board of the sensor to attain a simple and inexpensive design. Moreover, it is important for the spaces between the scanner and the code disk carrying the code to be precisely maintained to avoid erroneous values. A possibility to achieve this, resides in combining code disk and scanner in one unit and to assemble the same in the housing as a complete set. However, this measure involves comparatively great efforts. If the code disk alone is pivotally arranged on a mounting plate of its own to be then assembled in the housing it should, in addition, be noted that the tolerances of base plate and printed circuit panel or mounting plate of the scanner will add up.

It is the object of the invention to mount the components and units required for the sensor in a simple and inexpensive way within the appertaining housing. The code disk is arranged within the housing in a directly rotatable way, thereby enabling a highly precise adjustment of the code disk. The present invention is particularly beneficial in applications where the position of the code disk must be accurately adjusted by a precise orientation of the code disk drive over a driving tongue because the position of the housing is determined by the forced position of the code disk. To clearly associate the position of the scanner to the code disk the scanner is inserted into a socket rigidly connected to the housing. This clearly couples the scanner to the housing. Also, the position of the code disk relative to the scanner and the housing is fixed as both of them are directly connected to the housing.

Due to the position on the steering wheel directly or indirectly actuating the code disk, on the one hand, the position of the housing of the sensor module is predetermined, while, on the other hand, the steering pillar extending to the steering wheel must be given space in order to establish the connection between steering column and steering rod linkage. To insure short distances between the drive and the bearing of the code disk, it is, therefore, especially favorable to provide the bearing marginally of the passage opening of the steering pillar through the housing. To that extent, an annular wall is mounted marginally of the passage opening within the bottom of the housing, with the said wall holding the lid face of the code disk at a space from the housing bottom so that space will be provided for the code toothing preferably extending axially from the lid face of the code disk to the housing bottom. Conversely, the position of the code disk is clearly fixed with respect to the housing bottom as the spring struts resiliently hold the code disk in engagement with the annular wall of the housing bottom. To prevent the code disk from getting lost from the housing bottom, during introduction of the code disk into the housing bottom, the spring struts are deflected through the annular wall until they engage the locking hooks thereof, with the edge of the spring wall. The spring struts, in relaxed condition, preferably extend in parallel to the axis of rotation of the code disk and only during assembly are slightly deflected to provide space for the locking hooks to enable them to pass through the circular opening.

The groove toward the housing bottom and toward the circular hole is open thus being of an L-shaped contour circumferentially extending along the housing bottom. To insure a simple configuration both of the locking connection of the code disk within the housing and of the drive of the code disk, the code disk includes a circular hole slightly smaller that that of the housing bottom so that the spring struts extend in parallel to the inner surface of the annular wall facing the opening. However, it is not only the spring struts that emerge from the edge of the code disk opening, but support walls of approximately equal height are standing upright thereon to carry ears through which the code disk is at least indirectly actuated by the steering wheel.

To simply center the optical scanner over the teeth of the code disk forming the coding, the components of the scanner are adjusted in a common socket with respect to one another and, hence, through the housing bottom, also with respect to the coded teeth of the code disk. The tape elements of the scanner are, therefore, firmly centered with respect to one another through the bays associated thereto and are optically coupled to one another through the slots extending into the grooves. The square coding teeth then annularly move in series within the said groove track, with the teeth being scanned, thereby determining the position of the code disk.

In order to enable the printed circuit board of the code disk to be loaded on both sides, stepped centering pins are provided on the housing bottom. This will especially apply if the scan elements of the scanner are integrated into the printed circuit board. Conversely, the distance of the printed circuit board from the housing bottom provides the required space in order to enable the printed circuit panel to be loaded, if need be, on both sides. In practice, it has proved advantageous to load one side of the printed circuit board and to solder, on the opposite side, the connections to the conductor lines on the printed circuit panel. In that case, the contact pieces and the contact ring of the stepping switch (see EM 95/364) are located on the same side on which the contact points are to be soldered. If the socket of the scanner is to be designed as a separately mounted unit to enable easy replacement or adjustment during assembly, a bay is formed in the housing bottom as also in that case a firm association between the position of the scanner and the position of the code disk within the housing is permitted.

DETAILED DESCRIPTION OF THE PREFERRED EMBODIMENTS

Figure 1:
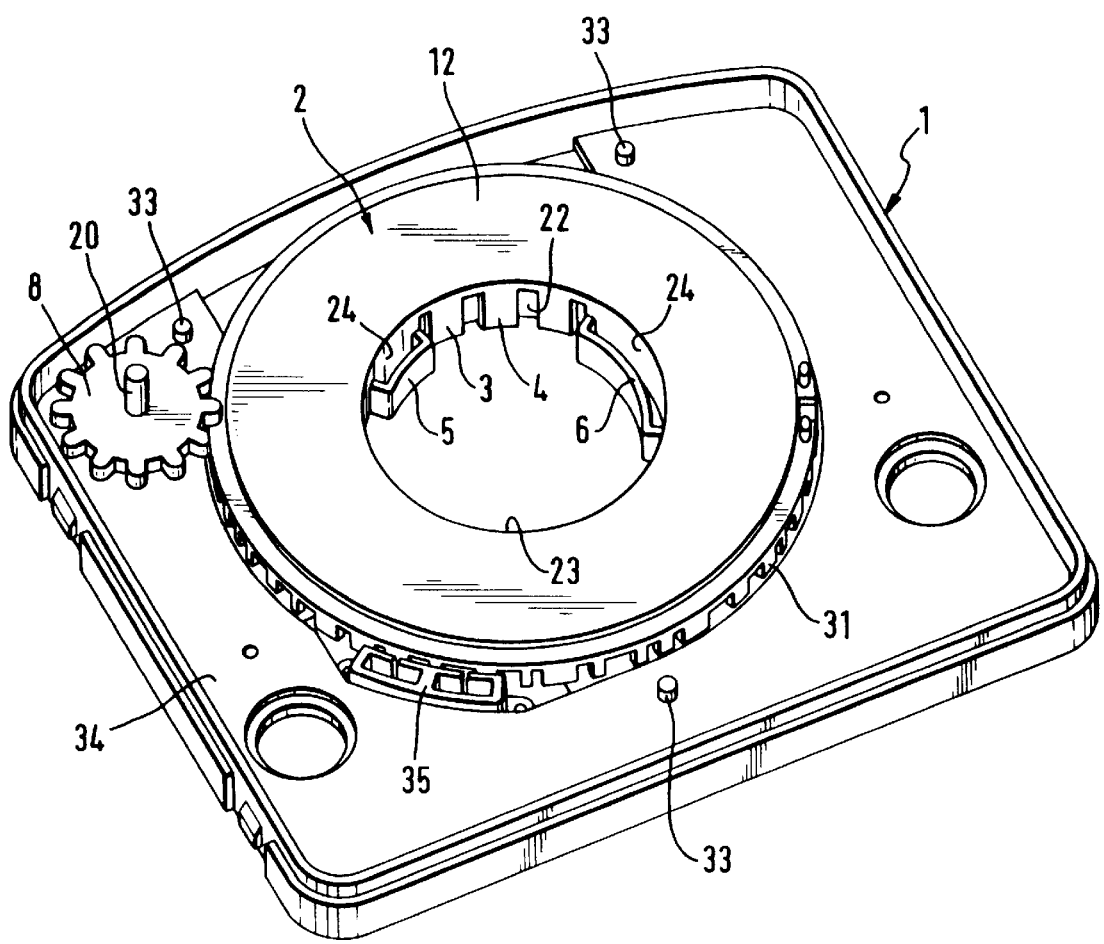
FIG. 1 is a perspective view of the opened housing bottom with the code disk mounted.
Figure 2:
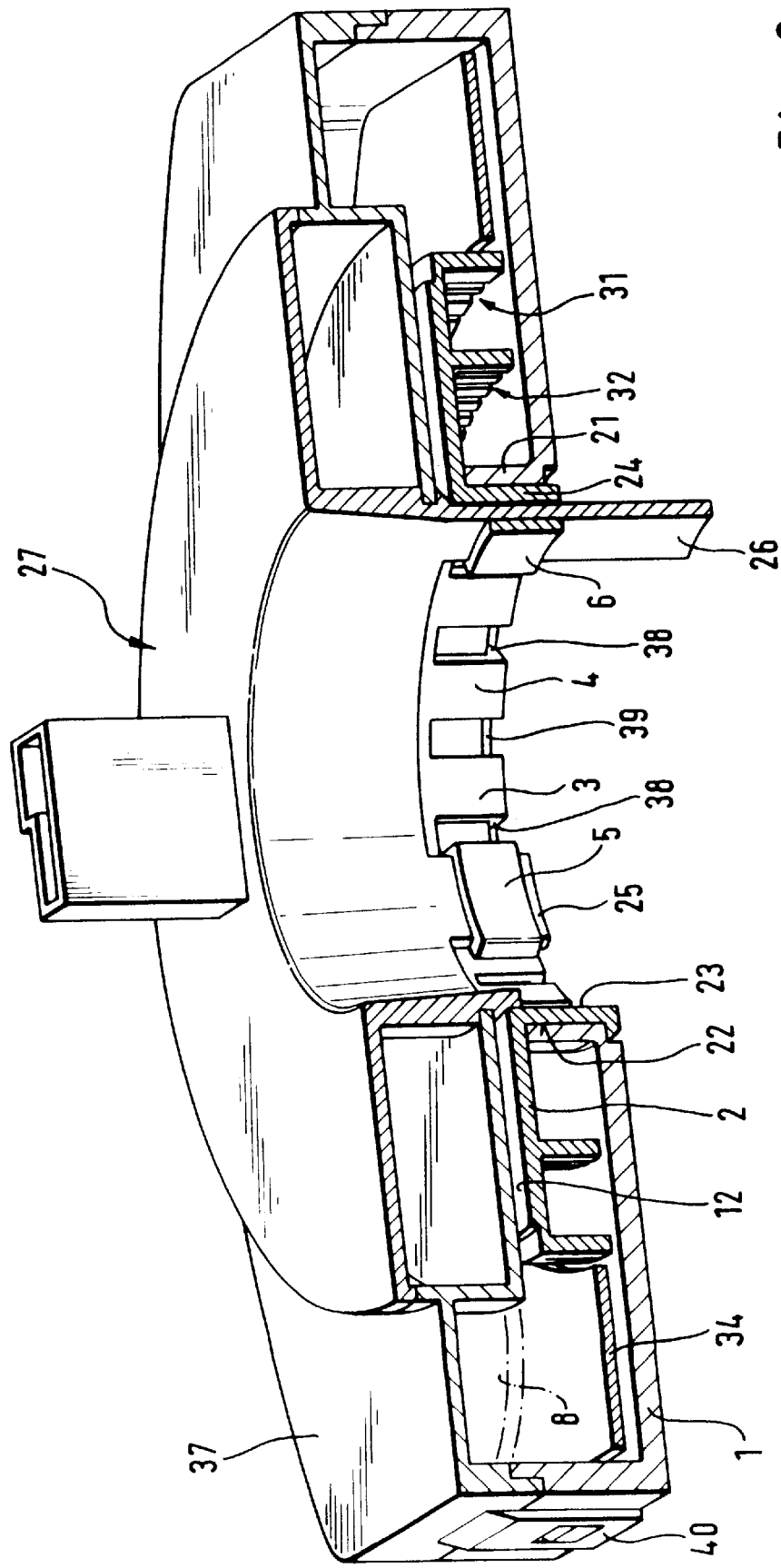
FIG. 2 is a sectional view of the housing with a transfer module for actuating the code disk mounted.

FIG. 1 shows the opened housing bottom in which the code disk 12 is rotatably disposed, with the code disk being supported on an annular wall 21 of the housing (see FIG. 2) confining a circular opening 21 within the housing 1. The support on the annular wall of the housing is through the code disk both in the radial and in the axial direction as the code disk 2 with the lid surface 12 thereof is superposed on the front edge of the annular wall of the housing. Moreover, the code disk 2 also includes a circular passageway 23 which is slightly smaller than the circular hole 22. Spring struts (e.g. 3,4) extend axially downwardly from the edge of the said circular passageway, abutting the surface of the annular wall 21 of the housing facing the circular hole 22 so that the code disk also is locked in the radial direction. The resilient wheel struts, at the free ends thereof, are provided with locking hooks (not shown) facing radially outwardly and engaging the bottom edge of the partition 21, thereby locking the code disk also in the axial direction. In addition, support walls 24 are provided between the locking struts 4; they are arranged on the same circular circumference as the locking struts and are approximately of the same length as the spring struts, yet of a substantially greater width than the latter. These non-resilient support walls carry transport ears 5,6 via which the code disk is indirectly actuated by the steering wheel in that the transport tongues 25,26 of a rotatable transfer unit actuated by the steering wheel drive the code disk to perform a rotating movement.

Figure 6:
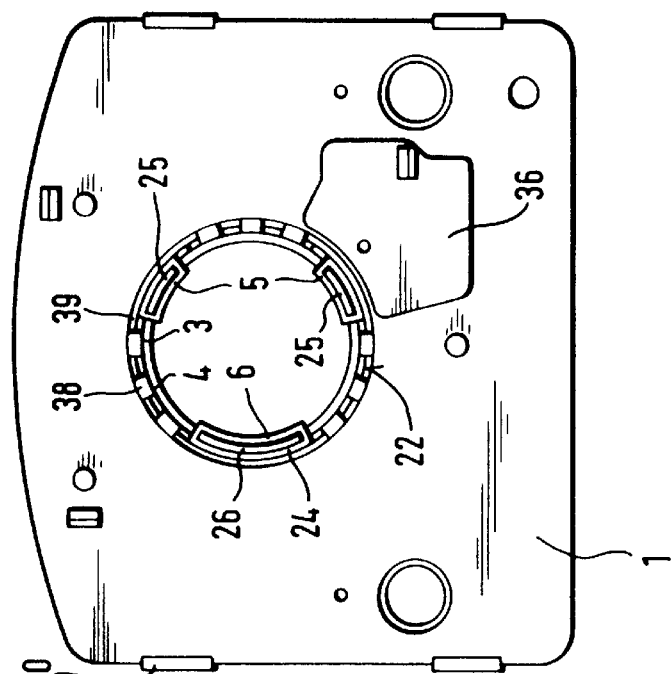
FIGS. 4 to 6 are a plan view, a side view and a view from the bottom of the housing for the steer angle sensor.
Figure 5:
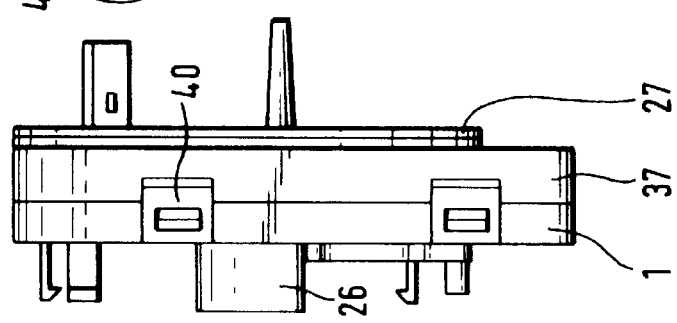
Figure 4:
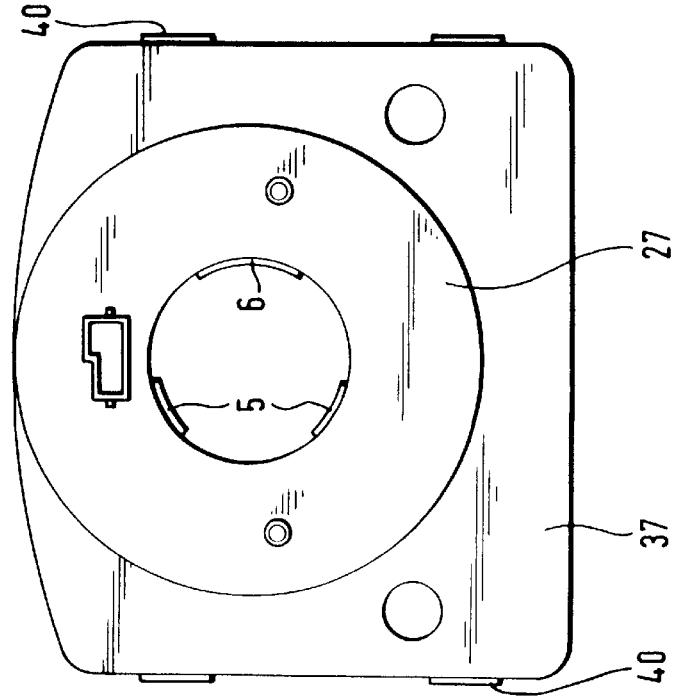

Provided on the outer edge of the code disk and on an incremental circuit radially disposed farther to the interior are, on the one hand, a code track and, on the other hand, an incremental track, with the code track 31 comprising downwardly protruding teeth defining in the form of a code the rotating position of the code disk 2, while the equidistantly arranged, downwardly directed teeth of the incremental track 32 serve for determining momentary changes in position. The way of operation of the code disk has already been described in Applicant's application No. 195 32 903.1. Through stepped centering pins 33 (see FIG. 1), a printed circuit panel 34 is fixed at a space from the housing bottom, with the printed circuit board embracing the outer contour of the code disk in an approximately arcuate form. Centering pins (not shown) fix a symbolically shown socket 35 to the housing bottom 1, with the socket containing both the light emitters and the light receivers for scanning the code disk. The socket is arranged in a bay of a conforming contour within the housing bottom, and is furnished with circular sector-shaped grooves passing along the incremental teeth or code teeth during rotation of the code disk 2. Determining the position of the code disk 2 is by changing the light flux between light emitters and light receivers based on the coding and incremental teeth passing along the same. FIG. 6 shows the downwardly bulging bay 36 for accommodating the socket 35. The bay enables the bottom of the circular sector-shaped grooves to be arranged within the socket 35 at a lower level than the open ends of the teeth of the code disk 2 passing along the said grooves, with the code disk being kept rather flat.

FIG. 1 shows, in addition, a switch wheel 8 forming part of a stepping switch already described in connection with Applicant's application P 8636. The rotating shaft 20 rigidly connected to the switch wheel 8 is rotatably disposed in a bearing hole within the housing in a manner protruding through the printed circuit panel 34. The upper end of the bearing shaft 20 facing the viewer is disposed accordingly in the housing lid 37 mounted on the housing bottom.

Figure 3:
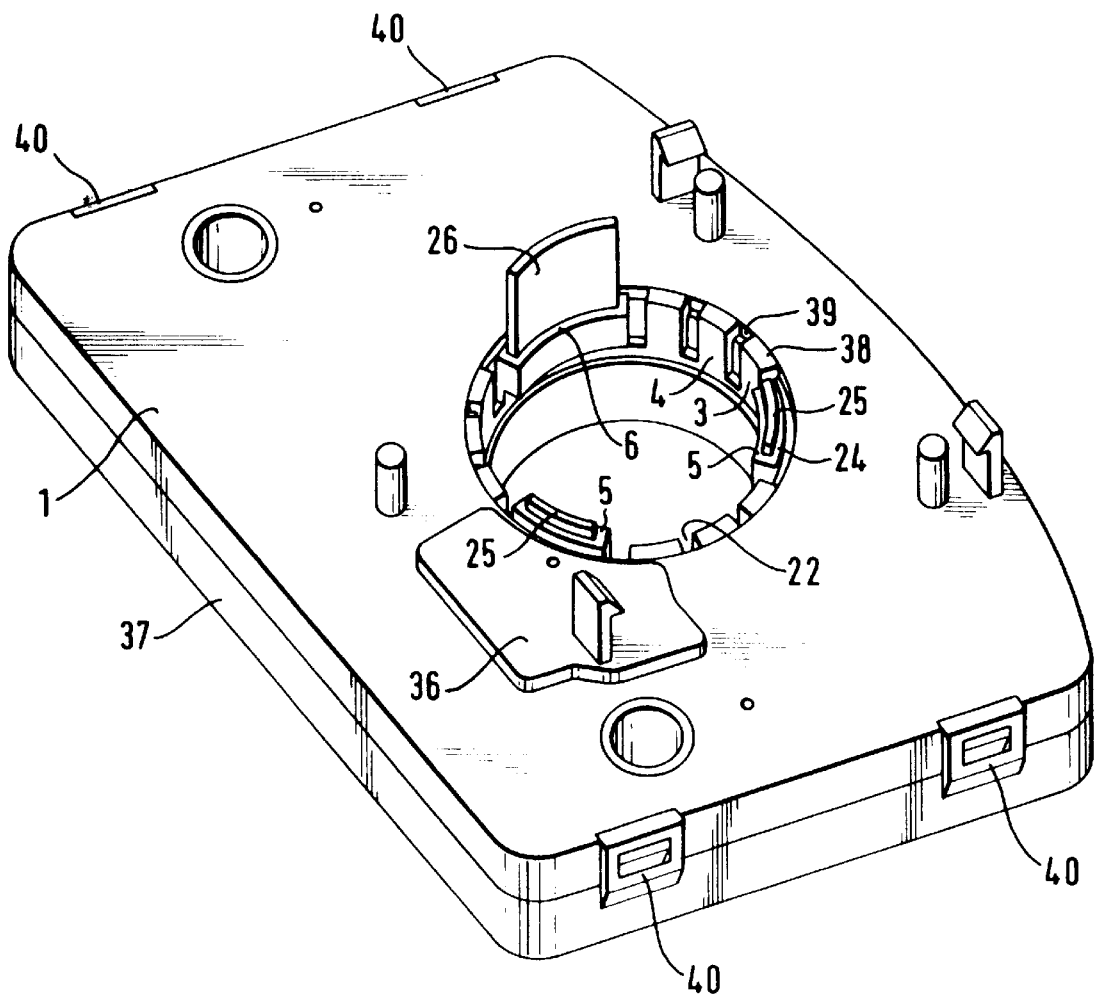
FIG. 3 is a perspective view of the housing bottom-viewed from below-with the code disk locked.

FIG. 3 shows the housing bottom, viewed from below. The locking struts 4 are well visible from this view; through locking hooks 38 they engage a circumferential open groove 39 at the bottom end of the circular opening 22, thereby axially locking the code disk vis-à-vis the housing bottom 1. The transport ears 5 and 6 are of a different width as are the associated transport tongues 25,26 so that the position of the code disk 2 is fixed with respect to the transport tongues, with the two ears 5 and two tongues 25, respectively, being narrower than ear 6 and tongue 26, respectively. In the practice of the invention, it is not necessary for the code track to be transported via the tongues 25,26 of the transfer unit 27. A direct actuation of the steering wheel will rather also be possible. The housing bottom 1 is locked by means of locking springs 40 as shown in FIG. 3. The housing lid 37 is stepped toward the interior to thereby provide, in connection with the transfer unit 27, the space for accommodating this unit so that the housing lid 37 at the same time forms the housing bottom for the transfer unit 27. This design is not mandatory in connection with the present invention, and is separately described in Applicant's application No. EM 95/364.

In order to permit replacement of the electronic circuit along with the socket of the scanner it is advisable to associate to the socket a section of the printed circuit board which is separately arranged within the bay 36 of the socket so that the socket and the printed circuit panel section are in superposed relationship.

What is claimed is:

1. A steer angle sensor module, comprising:
    a first housing section, including a housing bottom, a second housing section including a housing lid,
    a rotatable code disk disposed within a space defined between said first and second housing sections,
    an electric circuit including at least one scanner for scanning the code disk, wherein the code disk is rotably arranged directly on the first housing section in spaced relationship therefrom, wherein the first housing section includes a circular hole on an edge of which a ring wall which faces the interior of the first housing section wherein the code disk is supported on the front face of the ring wall facing an interior of the housing, and further including
    locking struts projecting from the code disk by way of ring wall, by radially outwardly extending locking hooks, engage an outer face of the housing bottom.

2. A module according to claim 1, wherein the ring wall is provided with a circumferential groove engaged by the locking hooks.

3. A module according to claim 1, wherein the circular code disk includes a central circular passageway conforming to a bottom hole, from the edge of which a locking strut project with circular sector-shaped support walls standing between the locking struts arranged in groups on the circular edge of the passageway, with the support walls carrying circular-sector-shaped transport ears protruding into the circular hole.

4. A module according to claim 1, further including stepped centering pins provided on the housing bottom, centering the printed circuit board surrounding the code disk and holding it in spaced relationship from the housing bottom.

5. A module according to claim 1, further including a bay formed in the housing bottom wherein said electric circuit resides, and wherein said electric circuit includes at least one light source and at least one light detector.

6. A module according to claim 1, wherein the scanner is inserted into a socket rigidly connected to the first housing section.

7. A module according to claim 6, wherein the socket of the scanner accommodates a plurality of light sources and a plurality of detectors associated thereto within accommodating bays arranged in three rows in a circular sector-shaped way, that the socket, within the walls of the accommodating bays, are provided with slot-type hoes for transmitting and receiving of light rays, and that the socket comprises circular sector-shaped grooves open at the front faces in which openings arranged radially opposite one another are terminating, and which accommodate circularly moving projections of the code and incremental tracks of the code disk.

8. A steer angle sensor module, comprising:
- a first housing section, including a housing bottom, a second housing section including a housing lid,
- a rotatable code disk disposed within a space defined between said first and second housing sections,
- an electric circuit including at least one scanner for scanning the code disk, wherein the code disk is rotably arranged directly on the first housing section in spaced relationship therefrom, wherein the circular code disk includes a central circular passageway conforming to a bottom hole, from the edge of which a locking strut project with circular sector-shaped support walls standing between the locking struts arranged in groups on the circular edge of the passageway, with the support walls carrying circular-sector-shaped transport ears protruding into the circular hole.

9. A module according to claim 8, wherein the ring wall is provided with a circumferential groove engaged by the locking hooks.

10. A module according to claim 8, further including stepped centering pins provided on the housing bottom, centering the printed circuit board surrounding the code disk and holding it in spaced relationship from the housing bottom.

11. A module according to claim 8, further including a bay formed in the housing bottom wherein said electric circuit resides, and wherein said electric circuit includes at least one light source and at least one light detector.

12. A module according to claim 8, wherein the scanner is inserted into a socket rigidly connected to the first housing section.

13. A module according to claim 12, wherein the socket of the scanner accommodates a plurality of light sources and a plurality of detectors associated thereto within accommodating bays arranged in three rows in a circular sector-shaped way, that the socket, within the walls of the accommodating bays, are provided with slot-type hoes for transmitting and receiving of light rays, and that the socket comprises circular sector-shaped grooves open at the front faces in which openings arranged radially opposite one another are terminating, and which accommodate circularly moving projections of the code and incremental tracks of the code disk.

* * * * *